(12) United States Patent  
Buchhold et al.

(10) Patent No.: US 6,744,248 B2
(45) Date of Patent: Jun. 1, 2004

(54) ARRANGEMENT FOR DETECTING MOTION OF AN ENCODER

(75) Inventors: Reinhard Buchhold, Hamburg (DE); Michael Doescher, Hamburg (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/308,658

(22) Filed: Dec. 3, 2002

(65) Prior Publication Data

US 2003/0128027 A1 Jul. 10, 2003

(30) Foreign Application Priority Data

Dec. 8, 2001 (DE) .......................................... 101 60 450

(51) Int. Cl.⁷ ................................................ G01B 7/30
(52) U.S. Cl. ............................ 324/207.21; 324/207.22; 324/207.25; 324/174; 324/165
(58) Field of Search ................................. 324/165, 166, 324/173, 174, 207.2, 207.21, 207.22, 207.25

(56) References Cited

U.S. PATENT DOCUMENTS

| | | | | |
|---|---|---|---|---|
| 4,875,008 A | * | 10/1989 | Lorenzen | 324/207.21 |
| 5,351,005 A | * | 9/1994 | Rouse et al. | 324/252 |
| 5,488,294 A | * | 1/1996 | Liddell et al. | 324/207.21 |
| 5,789,919 A | * | 8/1998 | Umemoto et al. | 324/207.21 |
| 6,366,079 B1 | * | 4/2002 | Uenoyama | 324/207.21 |

FOREIGN PATENT DOCUMENTS

WO          90/06517 A1 *  6/1990

* cited by examiner

Primary Examiner—Jay M. Patidar
(74) Attorney, Agent, or Firm—Aaron Waxler

(57) ABSTRACT

An arrangement is described for detecting motion of an encoder which comprises magnetically active areas arranged along a main surface subtended at least substantially by a second spatial co-ordinate aligned in the direction of movement of the encoder and by a first spatial co-ordinate aligned at least substantially perpendicularly to the direction of movement of the encoder, which magnetically active areas are subdivided in a predetermined sequence along the second spatial co-ordinate, the arrangement comprising a magnetoresistive sensor element arranged in front of the main surface of the encoder in the direction of a third spatial co-ordinate aligned at least substantially perpendicularly to the main surface of the encoder, and a magnetic field-generating device for generating a magnetic field which permeates the magnetoresistive sensor element with field lines which are aligned at least substantially in a plane subtended by the first and the third spatial co-ordinate, the arrangement being adapted to generate a field line deflection, determined by the position of the encoder with respect to the magnetoresistive sensor element and the magnetic field-generating device, of the magnetic field generated by the magnetic field-generating device in the direction of the second spatial co-ordinate with a periodical recurrence determined by the predetermined sequence of the magnetically active areas and to supply an output signal having signal edges which rise and fall with said periodical recurrence and are produced by the magnetoresistive sensor element on the basis of the influence by this field line deflection, the arrangement being further adapted to generate a field line deflection, likewise determined by the position of the encoder, of the magnetic field also in the direction of the first spatial co-ordinate in said periodical recurrence, and a signal-processing circuit for detecting the slopes of consecutive signal edges in the output signal and for supplying a motion direction signal in dependence upon the values and/or the sequence of values of the slopes of consecutive signal edges.

1 Claim, 5 Drawing Sheets

Figure 1:
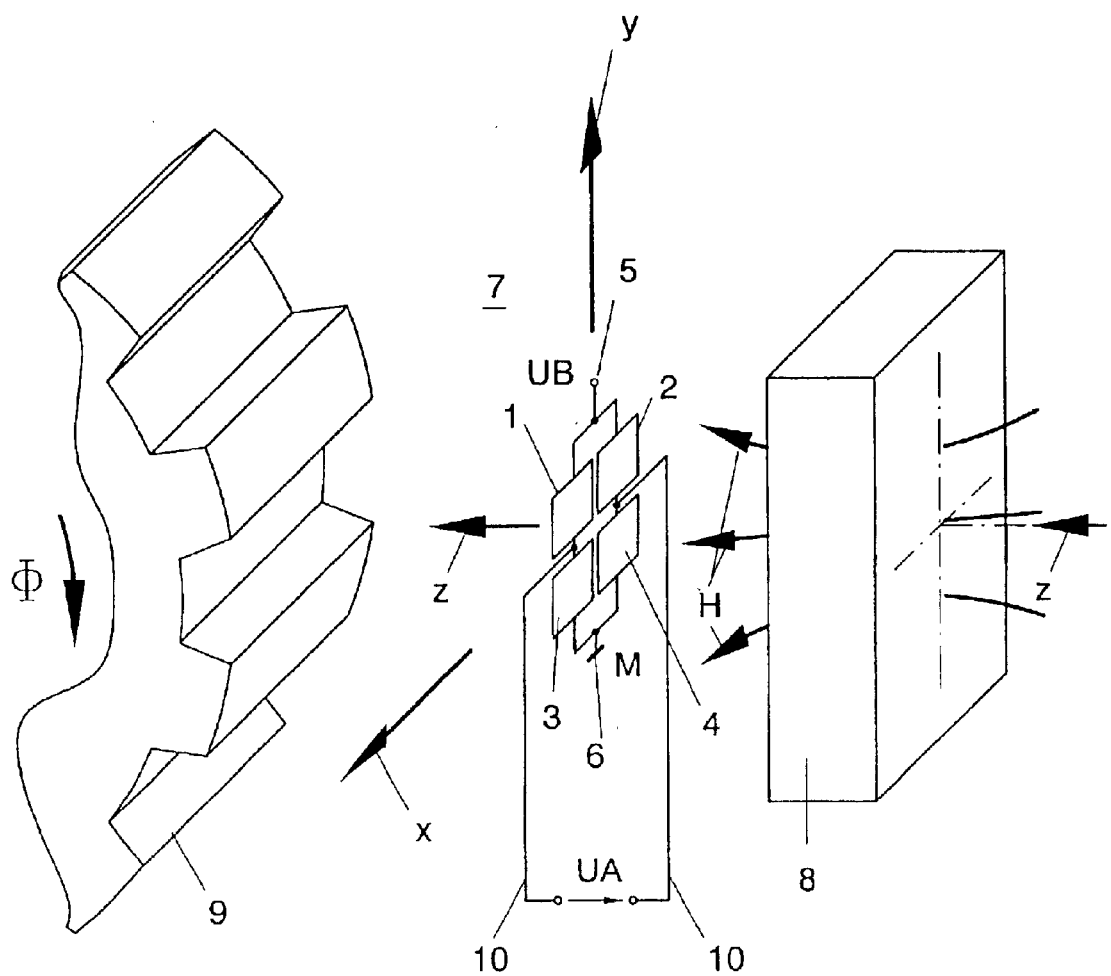

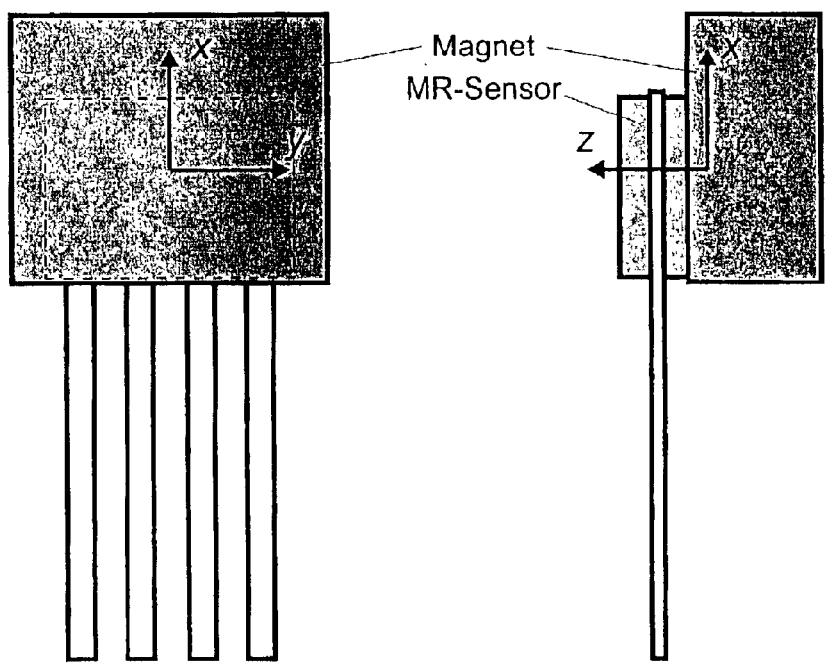
FIG.2
working and supporting field
without ferromagnetic counter element
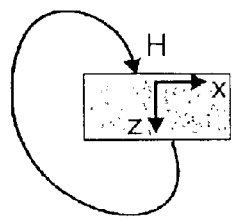
with ferromagnetic counter element
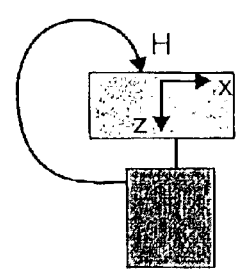
characteristic curve
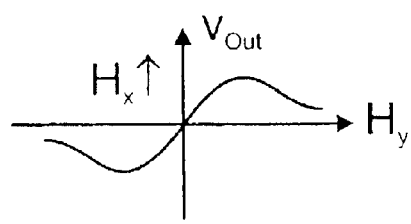
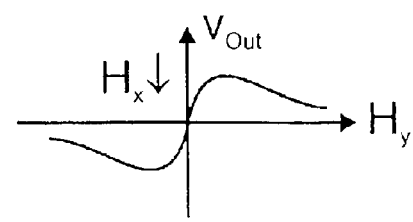
FIG.3a          FIG.3b

ARRANGEMENT FOR DETECTING MOTION OF AN ENCODER

The invention relates to an arrangement for detecting motion of an encoder.

An apparatus for use in electronically controlled fuel injection systems is known from WO 90/06517 A1, which detects the speed, angular position and direction of movement of a rotation by using a single Hall sensor. The apparatus comprises a disc-shaped element which is fixedly connected to the camshaft of a combustion engine and is rotatable therewith. The disc-shaped element comprises a multitude of peripheral zones of substantially equal length, each of which has a first and a second area. A first part of the zones has first and second areas whose length clearly deviates from the first and second areas of a second part of the zones. Accordingly, the sensor supplies a signal whose frequency is directly related to the instantaneous speed of the disc-shaped element, but whose pulse width alternates in dependence upon the first and second parts of the zones. A program-controlled microprocessor detects the instantaneous angular position and the direction of rotation of the disc-shaped element by detecting the position of the second part of the zones and the sequence in which they are received.

Such an arrangement requires a very elaborate construction for the disc-shaped element. Moreover, an unambiguous determination of the speed, angular position and direction of movement of the rotation to be detected is only possible after approximately a full rotation of the disc-shaped element.

It is an object of the invention to provide an arrangement for detecting motion of an encoder, which allows a simple, fast and accurate measurement of both the speed and the detection of the direction of movement of this encoder.

According to the invention, this object is solved by an arrangement for detecting motion of an encoder which comprises magnetically active areas arranged along a main surface subtended at least substantially by a second spatial co-ordinate aligned in the direction of movement of the encoder and by a first spatial co-ordinate aligned at least substantially perpendicularly to the direction of movement of the encoder, which magnetically active areas are subdivided in a predetermined sequence along the second spatial co-ordinate, the arrangement comprising a magnetoresistive sensor element arranged in front of the main surface of the encoder in the direction of a third spatial co-ordinate aligned at least substantially perpendicularly to the main surface of the encoder, and a magnetic field-generating device for generating a magnetic field which permeates the magnetoresistive sensor element with field lines which are aligned at least substantially in a plane subtended by the first and the third spatial co-ordinate, the arrangement being adapted to generate a field line deflection, determined by the position of the encoder with respect to the magnetoresistive sensor element and the magnetic field-generating device, of the magnetic field generated by the magnetic field-generating device in the direction of the second spatial co-ordinate with a periodical recurrence determined by the predetermined sequence of the magnetically active areas and to supply an output signal having signal edges which rise and fall with said periodical recurrence and are produced by the magnetoresistive sensor element on the basis of the influence by this field line deflection, the arrangement being further adapted to generate a field line deflection, likewise determined by the position of the encoder, of the magnetic field also in the direction of the first spatial co-ordinate in said periodical recurrence, and a signal-processing circuit for detecting the slopes of consecutive signal edges in the output signal and for supplying a motion direction signal in dependence upon the values and/or the sequence of values of the slopes of consecutive signal edges.

The invention is based on the recognition that the characteristic curve of a magnetoresistive sensor element, which describes the dependence of an output voltage supplied by this element on the magnetic field strength of a component of the magnetic field generated by the magnetic field-generating device and occurring due to the field line deflection in the direction of movement of the encoder, has a slope which is dependent on the alignment of the magnetic field lines also in the direction of the first spatial co-ordinate, i.e. substantially perpendicularly to the direction of movement of the encoder. The smaller the alignment of the magnetic field lines also in the direction of the first spatial co-ordinate, i.e. substantially perpendicularly to the direction of movement of the encoder, i.e. the smaller the component of the magnetic field in the direction of this first spatial co-ordinate, the larger the slope of the characteristic curve in its zero region, which is determined by the disappearance of the magnetic field component occurring due to the field line deflection in the direction of movement of the encoder and the zero crossing of the output voltage supplied by the magnetoresistive sensor element. This means that, in the case of movement of the encoder along its direction of movement, i.e. in the direction of the second spatial co-ordinate, particularly steep changes of the output voltage supplied by the magnetoresistive sensor element are obtained at those areas where the magnetic field component in the direction of the first spatial co-ordinate is small, whereas the changes of the output voltage supplied by the magnetoresistive sensor element along the direction of movement of the encoder extend more flatly in those areas where the magnetic field component in the direction of the first spatial co-ordinate is larger. This involves a non-linear change of the characteristic curve along the direction of movement of the encoder, which has the effect that, in the case of motion of the encoder in dependence upon the direction of movement, the rising signal edges of the output voltage supplied by the magnetoresistive sensor element have a different slope than the falling signal edges of this output voltage. By evaluating these slopes of consecutive output voltage signal edges, i.e. edges rising and falling with said periodical recurrence, a motion direction signal indicating the direction of movement can then be directly obtained.

The magnetically active areas arranged along the main surface of the encoder and subdivided in a predetermined sequence along the second spatial co-ordinate may be formed differently, for example, as areas of a different magnetization of a magnetic material arranged along the main surface of the encoder or as toothed projections alternating with indentations along the direction of movement in a magnetizable material arranged along the main surface of the encoder.

The invention thus simply provides the possibility of determining the value and direction of the speed of a movement of the encoder with respect to the magnetoresistive sensor element. Advantageously, a conventional one-track encoder having only one row or track of magnetically active areas arranged along its main surface in the direction of movement, and only one magnetoresistive sensor element are required for this determination. The advantages such as, for example, the temperature compensation of such magnetoresistive sensor elements formed particularly as full Wheatstone bridges can thereby be utilized and the drawback of spatial mutual adjustments of a plurality of sensor elements can be avoided.

These and other aspects of the invention are apparent from and will be elucidated with reference to the embodiments described hereinafter.

In the Drawings

Figure 4A:
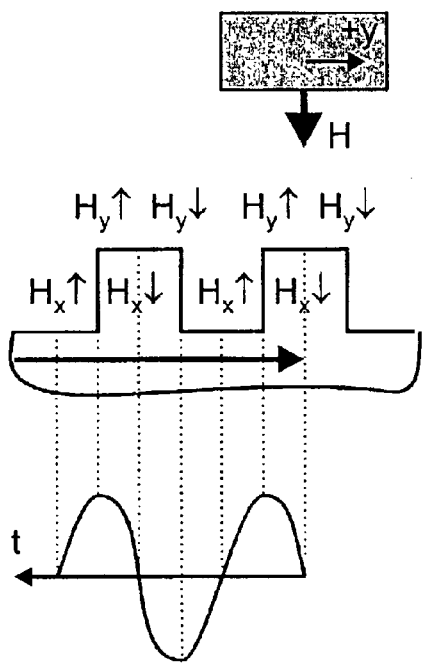
Figure 4B:
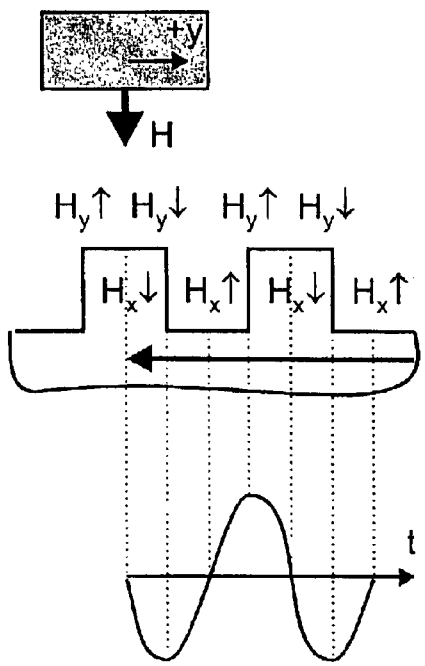
Figure 5:
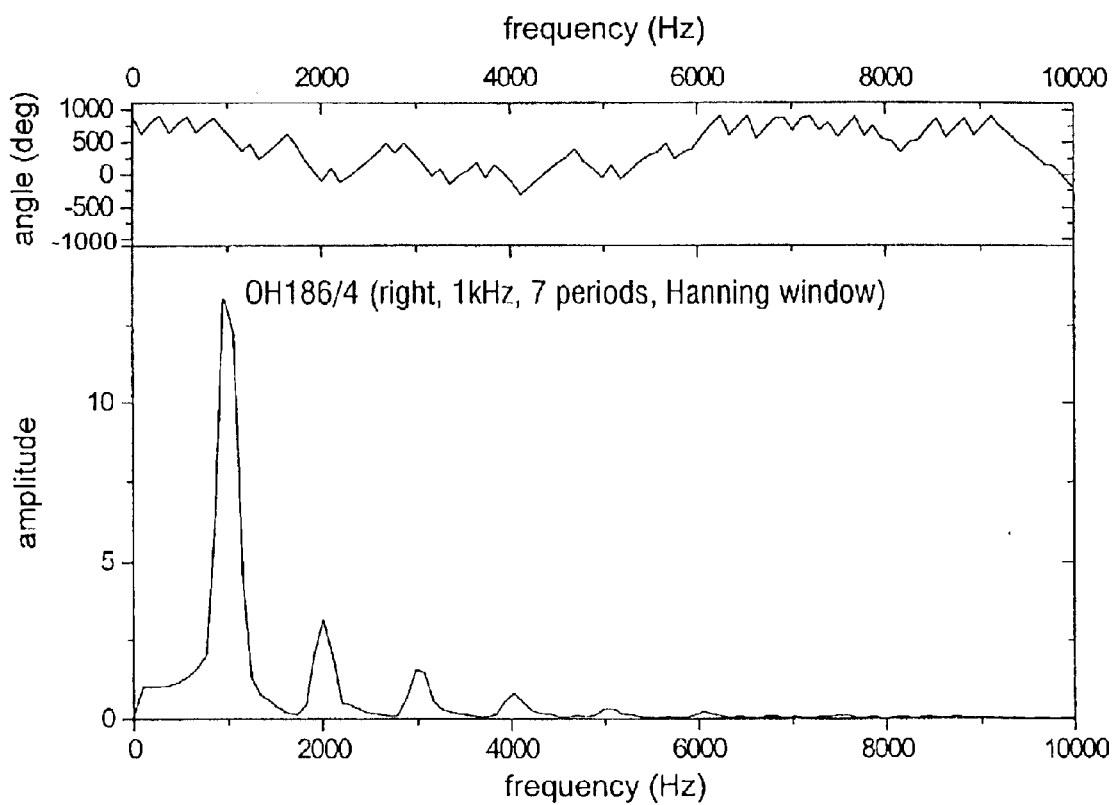
Figure 6:
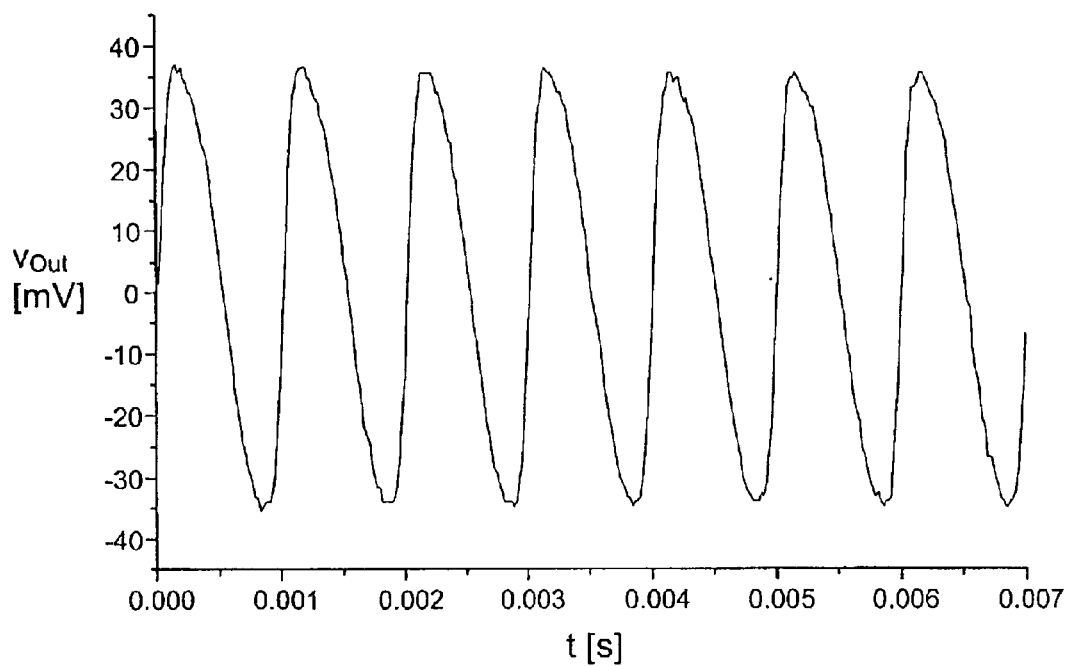
Figure 7:
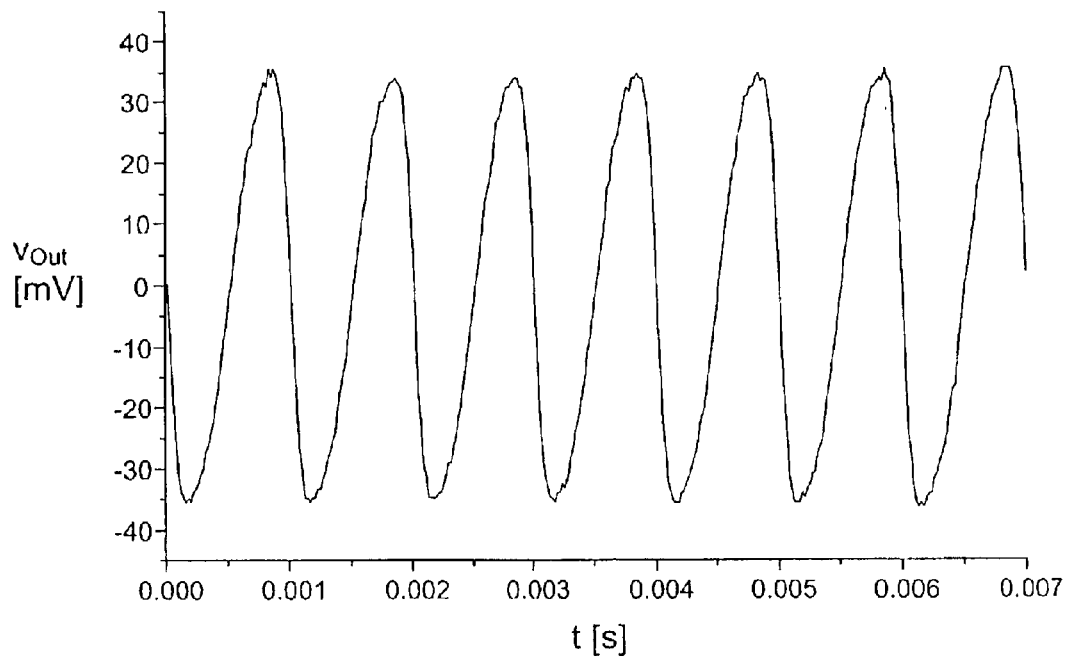
Figure 8:
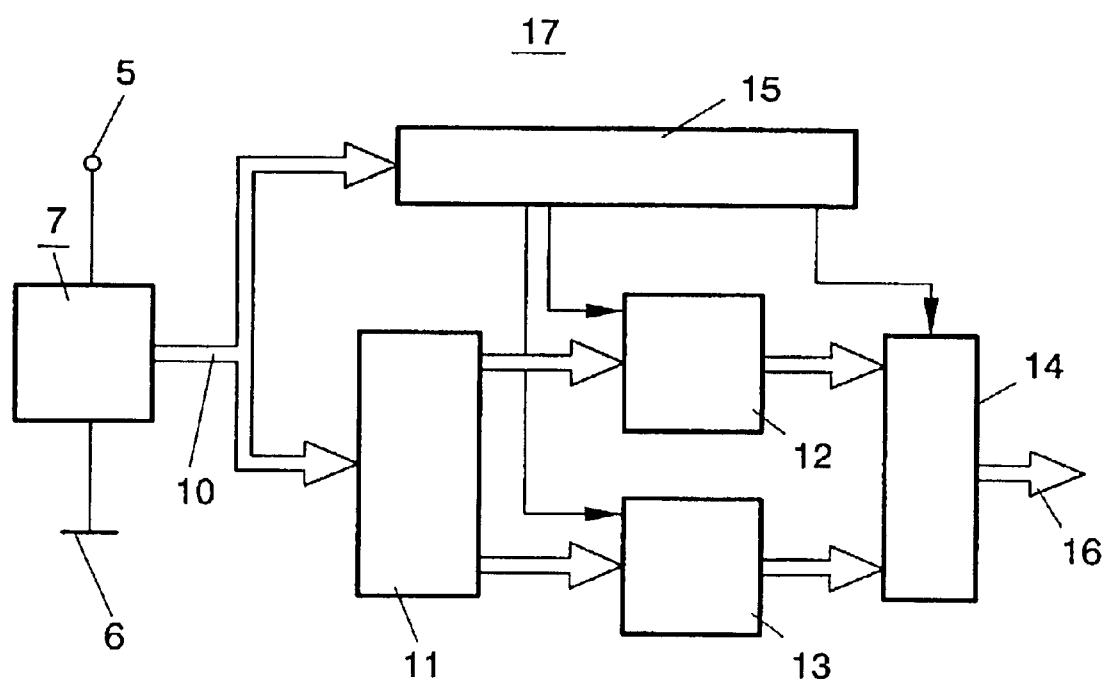

FIG. 1 shows diagrammatically, by way of example, an arrangement for detecting motion of a toothed encoder, FIG. 2 shows diagrammatically a spatial arrangement of a magnetoresistive sensor element with a working magnet as a magnetic field-generating device, FIG. 3 shows diagrammatically the deflection of the magnetic field lines in the direction of the first spatial co-ordinate transverse to the direction of movement of the encoder and their effect on the characteristic curve of the magnetoresistive sensor element, FIG. 4 shows diagrammatically the changes of the magnetic field components produced upon movement of the encoder by the field line deflection of the magnetic field in the direction of the first spatial co-ordinate transverse to the direction of movement of the encoder as well as in the direction of the second spatial co-ordinate in the direction of movement of the encoder and their effect on the output signal of the magnetoresistive sensor element, FIG. 5 shows, by way of example, a frequency spectrum of the output signal of an arrangement according to the invention, FIG. 6 shows, by way of example, an output signal of an arrangement according to the invention for a movement of the encoder in a first direction of movement, FIG. 7 shows, by way of example, an output signal of an arrangement according to the invention for a movement of the encoder in a second direction of movement, and FIG. 8 shows diagrammatically an embodiment of a signal-processing circuit.

FIG. 1 shows diagrammatically, by way of example, an embodiment of an arrangement according to the invention for detecting motion of an encoder. The encoder is shown as a gear wheel 9 of a magnetizable, ferromagnetic material, e.g. iron, extending along its cylindrical surface representing the main surface of the encoder. The magnetically active areas arranged along the main surface of the encoder 9 are formed as toothed projections alternating with indentations in a predetermined sequence in the magnetizable material arranged along the main surface of the encoder 9 along a motion co-ordinate Φ of the rotating encoder 9 aligned in the circumferential direction of the encoder 9, i.e. in its direction of movement. The arrangement shown in this embodiment is used for measuring the rotational speed of the rotating encoder 9, which may also be referred to as motion sensor element.

In the arrangement of FIG. 1, a magnetoresistive sensor element 7 is arranged in front of the surface of the encoder 9, i.e. in front of its main surface. This sensor element comprises four bridge branches 1, 2, 3, 4 which, in known manner, comprise a magnetoresistive resistor each formed, for example, as a permalloy strip arranged in a meandering configuration on the silicon substrate and are configured as a Wheatstone bridge. This Wheatstone bridge is arranged between a first power supply terminal 5 to which, in operation, a first power supply potential UB is supplied, and a second power supply terminal 6 to which, in operation, a second power supply potential M, preferably ground potential, is supplied. In the embodiment shown, the sensor element is planar-arranged in a plane subtended by a first spatial co-ordinate, referred to as x co-ordinate axis, and a second spatial co-ordinate, referred to as y co-ordinate axis, of a Cartesian system of co-ordinates. A third spatial co-ordinate, referred to as z co-ordinate axis, is perpendicular to this plane. This magnetoresistive sensor element is denoted in its entirety by the reference numeral 7.

Furthermore, a rectangular permanent magnet, referred to as working magnet 8, is mounted on the sensor element 7. In a practical embodiment, this working magnet 8 is preferably stuck to the rear side of the sensor element 7 or of a housing surrounding the sensor element 7 so that the sensor element 7 is permeated by a magnetic field H of the working magnet 8. The main direction of the field lines of this magnetic field H extends along the z co-ordinate axis.

The magnetoresistive sensor element 7 has a measuring direction along the y co-ordinate axis. Along this measuring direction, it is sensitive to the polarity and the field strength of the magnetic field H of the working magnet 8 and is formed to supply a measuring signal in dependence upon a field component of this magnetic field H, denoted as measuring field and measured in the measuring direction. The measuring signal is shown in FIG. 1 as an output voltage UA which is present between two taps 10 on the Wheatstone bridge.

To measure the rotational speed of the rotating motion sensor element 9 by means of the sensor element 7 described hereinbefore, the rotating motion sensor element 9 is positioned in the direction of the z co-ordinate axis in front of the sensor element 7 and is formed from a gear wheel-shaped ferromagnetic material and rotates, in operation, in the direction of the motion co-ordinate Φ, which, along the motion co-ordinate Φ of the motion sensor element 9, leads to a distortion of the field lines of the magnetic field H of the working magnet 8 in the measuring direction of the sensor element 7 extending in the direction of the y co-ordinate axis, which distortion occurs periodically with the distance between the teeth of the toothed projections of the motion sensor element 9. The field component of the magnetic field H in the measuring direction extending in the direction of the y co-ordinate axis is denoted as measuring field. An at least substantially sinusoidal output signal UA, which is dependent on this motion co-ordinate Φ of the motion sensor element 9, is preferably generated via the motion co-ordinate Φ by the measuring field in the sensor element 7.

FIG. 2 shows diagrammatically an example of a spatial arrangement of a magnetoresistive sensor element 7—MR sensor—with a working magnet 8—magnet—attached to it as a magnetic field-generating device. This Figure shows a preferred implementation of the magnetoresistive sensor element 7 in a substantially rectangular housing having four connection lugs and being sealed flat onto the working magnet 8. The sealing face is aligned in the plane subtended by the x co-ordinate axis and the y co-ordinate axis and the z co-ordinate axis is perpendicular thereto.

To generate the magnetic field H, the working magnet 8 is magnetized in such a way that, without a ferromagnetic counterelement leading to a deflection of the field lines, not only the main component of the magnetic field H aligned in the direction of the z co-ordinate axis but also a component, here denoted by $H_x$, in the direction of the x co-ordinate axis is present at the location of the magnetoresistive sensor element 7, which component $H_x$ is referred to as supporting field and serves for adjusting the characteristic curve of the magnetoresistive sensor element 7. This alignment of the field lines of the magnetic field H is shown diagrammatically in FIG. 1 and FIG. 3a in different spatial views. It leads to a characteristic curve variation which is also shown in FIG. 3a as a diagram of the output voltage UA, here denoted as $V_{Out}$, of the magnetoresistive sensor element 7 with respect to the measuring field, here denoted as $H_y$. At a (relatively) large field strength of the supporting field $H_x$, a relatively flat characteristic curve variation, i.e. a small slope of the characteristic curve is obtained in the zero region in this diagram.

If, however, the magnetic field H of the working magnet 8 is distorted, for example, by introducing a ferromagnetic counter element (or by other magnetic field-influencing measures such as, for example, introduction of a further magnetic body), such that the field lines in the area of the magnetoresistive sensor element 7 are aligned to a greater extent in the direction of the z co-ordinate axis and thereby reduce the field component of the supporting field $H_x$ aligned in the direction of the x co-ordinate axis, the ratios shown diagrammatically in FIG. 3b are obtained. The reduction of the field component of the supporting field $H_x$ leads to a steeper characteristic curve variation of the characteristic curve of the output voltage $V_{Out}$ of the magnetoresistive sensor element 7 with respect to the measuring field $H_y$ in the zero region.

When moving the encoder 9 along the motion co-ordinate Φ, there is thus a stronger variation of the output voltage $V_{Out}$ of the magnetoresistive sensor element 7 via the motion co-ordination Φ and hence with respect to time t required by this motion in front of a ferromagnetic counter element, i.e. particularly in front of a tooth of the gear wheel, than is the case in front of a gap between two teeth of the gear wheel.

FIGS. 4a and 4b show diagrammatically the effect of these differently strong variations of the output voltage $V_{Out}$ of the magnetoresistive sensor element 7 via the motion co-ordinate Φ and hence with respect to time t, required by this motion, on the temporal variation of the output voltage $V_{Out}$ of the magnetoresistive sensor element 7 in dependence upon the direction of movement along the motion co-ordinate Φ. In FIG. 4a, a direction of movement is assumed which is directed towards the right in the associated diagram and is denoted by an arrow in the central part of the diagram. However, in FIG. 4b, a direction of movement is assumed which is directed towards the left in the associated diagram and is also denoted by an arrow in the central part of the diagram. These central parts of the diagrams diagrammatically represent the gear wheel shape of the encoder 9. The areas along the motion co-ordinate Φ and the y co-ordinate axis in which the field components of the supporting field $H_x$ and the measuring field $H_y$ alternately assume larger or smaller values, are diagrammatically denoted by the associated reference signs $H_x$, $H_y$ and the associated arrows. In the case of a direction of movement shown in FIG. 4a, the rising edges have a larger slope than the falling edges in the temporal variation of the output voltage $V_{Out}$ of the magnetoresistive sensor element 7, whereas the rising edges have a smaller slope than the falling edges in the temporal variation of the output voltage $V_{Out}$ of the magnetoresistive sensor element 7 in the case of a direction of movement as shown in FIG. 4b.

The generation of different slopes in the temporal variation of the output voltage $V_{Out}$ of the magnetoresistive sensor element 7 represents a non-linear distortion of this output voltage $V_{Out}$ and leads to the generation of components of a higher frequency in the frequency spectrum of the output voltage $V_{Out}$. These components of a higher frequency become clearly manifest in the frequency spectrum of the output voltage $V_{Out}$ particularly when the output voltage $V_{Out}$ has a preferably at least substantially sinusoidal shape. FIG. 5 shows, by way of example, such a frequency spectrum of the output voltage $V_{Out}$ of an arrangement according to the invention, namely the amplitude of such components of a higher frequency in the parts of the scale, assumed as examples, in the lower part of the diagram of FIG. 5 and of the phase angle—"angle(deg)"—in angle degrees in the upper part of the diagram shown in FIG. 5, both plotted on the frequency measured in Hertz—"frequency(Hz)"—of the output voltage $V_{Out}$ in an assumed case of operation, i.e. for an assumed, fixed motion speed.

Examples of measured variations of the output voltage $V_{Out}$ in an assumed case of operation are shown in the diagrams of FIGS. 6 and 7. FIG. 6 shows, by way of example, a variation of the output voltage $V_{Out}$ of an arrangement according to the invention, plotted with respect to time t for a movement of the encoder 9 in a first direction of movement—to the right in FIG. 4a—and FIG. 7 shows, by way of example, a variation of the output voltage $V_{Out}$ of an arrangement according to the invention, plotted with respect to time t for a movement of the encoder in a second direction of movement—to the left in FIG. 4b—, wherein the output voltage $V_{Out}$ is measured in millivolts [mV] and the time t is measured in seconds [s]. The slopes of the signal edges of these measured output voltages $V_{Out}$ in FIGS. 6, 7 correspond to those shown diagrammatically in FIGS. 4a, 4b.

FIG. 8 shows diagrammatically an embodiment of a signal-processing circuit 17 for detecting the different slopes of consecutive signal edges in a temporal variation of the output voltage UA or $V_{Out}$ supplied as output signal or measuring signal by the magnetoresistive sensor element 7 at the taps 10 on the Wheatstone bridge. The signal-processing circuit 17 comprises a differential stage 11 which receives the output voltage UA of the magnetoresistive sensor element 7 and generates therefrom at least a slope signal representing the temporal variations of the output voltage UA substantially by forming the first derivative of the output voltage UA. This slope signal is applied to a first and a second comparison device 12 and 13, respectively.

The output voltage UA of the magnetoresistive sensor element 7 is supplied from the taps 10 to a control stage 15. Control signals for the comparison devices 12 and 13 are generated in the control stage 15—in a manner controlled by the temporal variations of the output voltage UA—and applied to these devices. These control signals control the comparison devices 12 and 13 in such a way that the slope signal supplied by the differential stage 11 is evaluated only within given time windows which only comprise the temporal ranges of the rising and falling signal edges of the output voltage UA of the magnetoresistive sensor element 7. These time windows are preferably dimensioned in such a way that the first comparison device 12 only detects signal edges rising with time t, and that the second comparison device 13 only detects signal edges falling with time t. In the comparison devices 12 and 13, the slopes of the signal edges, i.e. the values of the slope signal in the predetermined time windows, are determined and these values are applied to corresponding signals of a combination stage 14.

In the combination stage 14, the signals from the comparison devices 12 and 13 corresponding to the values of the slope signal are logically combined—again for each time window controlled by the control stage 15—, while it is detected whether the value of the slope signal for a rising signal edge is larger or smaller than the value of the slope signal for a subsequent falling signal edge. In accordance with the result of this combination, a motion direction signal is generated in the combination stage 14 and supplied via an output 16. In this way, the motion direction signal is determined in dependence upon the values and/or the sequence of values of the slopes of consecutive signal edges.

In summary, and expressed in other words, the invention is preferably applicable in magnetoresistive sensors with barberpole structures which do not operate in the magnetic saturation range and detect the modulation of a magnetic field, which modulation is caused by the relative movement with respect to the ferromagnetic encoder, while the measurement of the modulation frequency of the electric output signal of the sensor in the known case of dividing the encoder provides the possibility of determining the speed of the relative movement. In operation, components of a higher frequency of the modulated output signal, which lead to different rise and fall times of the signal edges of the modulated output signal, are generated by the implementation of the magnetic system in accordance with the invention. In addition to the speed measurement, the comparison of these times allows detection of the direction of movement. The arrangement according to the invention can thus be preferably used in ABS sensors and for the automatic control of handbrakes.

In the invention, the magnetic field H to be modulated by the relative movement of the encoder in the direction of the y co-ordinate axis is provided by a permanent magnet which is magnetized in the x-z plane subtended by the x co-ordinate axis and the z co-ordinate axis. Simultaneously, the component of this magnetic field in the direction of the x co-ordinate axis serves as a supporting field for the characteristic curve adjustment of the magnetoresistive sensor.

The implementation according to the invention of the arrangement described hereinbefore and its magnetic circuit provides the possibility of modulating the magnetic field H not only in the direction of the y co-ordinate axis but also in the direction of the x co-ordinate axis. This modulation leads to non-linear changes of the characteristic curve of the magnetoresistive sensor.

The parts of the components of the magnetic field H denoted as supporting field $H_x$ and measuring field $H_y$ and being variable in dependence upon the motion of the encoder in the direction of the x and the y co-ordinate axis are periodically shifted about 90° in phase and, due to the non-linearity of the characteristic curve of the magnetoresistive sensor, they realize said components of a higher frequency in the spectrum of its output signal, which lead to the signal rise and fall times that differ in dependence upon the direction of movement.

The subsequent signal processing for evaluating the rise of the edges provides the possibility of determining the value and direction of the relative speed between the magnetoresistive sensor and the encoder.

List of Reference Signs 1 first bridge branch of the magnetoresistive sensor element 7
2 second bridge branch of the magnetoresistive sensor element 7
3 third bridge branch of the magnetoresistive sensor element 7
4 fourth bridge branch of the magnetoresistive sensor element 7
5 first power supply terminal (for first power supply potential UB)
6 second power supply terminal (for ground potential M)
7 magnetoresistive sensor element formed as a Wheatstone bridge
8 working magnet
9 rotating encoder
10 taps on the sensor element 7 for the output signal UA or $V_{Out}$
11 differential stage
12 first comparison device
13 second comparison device
14 combination stage
15 control stage
16 output for a motion direction signal
17 signal-processing circuit
H magnetic field of the working magnet 8
$H_x$ supporting field=component of the magnetic field H in the direction of the x co-ordinate axis
$H_y$ measuring field=component of the magnetic field H in the direction of the y co-ordinate axis
M second power supply potential (=ground potential)
t time
UA output signal of the sensor element 7 (=measuring signal=output voltage)
UB first power supply potential
$V_{Out}$ output signal of the sensor element 7 (=measuring signal=output voltage)
x co-ordinate axis
y co-ordinate axis
z co-ordinate axis
Φ motion co-ordinate of the rotating encoder 9

What is claimed is:

1. An arrangement for detecting motion of an encoder which comprises magnetically active areas arranged along a main surface subtended at least substantially by a second spatial co-ordinate aligned in the direction of movement of the encoder and by a first spatial co-ordinate aligned at least substantially perpendicularly to the direction of movement of the encoder, which magnetically active areas are subdivided in a predetermined sequence along the second spatial co-ordinate, the arrangement comprising a magnetoresistive sensor element arranged in front of the main surface of the encoder in the direction of a third spatial co-ordinate aligned at least substantially perpendicularly to the main surface of the encoder, and a magnetic field-generating device for generating a magnetic field which permeates the magnetoresistive sensor element with field lines which are aligned at least substantially in a plane subtended by the first and the third spatial co-ordinate, the arrangement being adapted to generate a field line deflection, determined by the position of the encoder with respect to the magnetoresistive sensor element and the magnetic field-generating device, of the magnetic field generated by the magnetic field-generating device in the direction of the second spatial co-ordinate with a periodical recurrence determined by the predetermined sequence of the magnetically active areas and to supply an output signal having signal edges which rise and fall with said periodical recurrence and are produced by the magnetoresistive sensor element on the basis of the influence by this field line deflection, the arrangement being further adapted to generate a field line deflection, likewise determined by the position of the encoder, of the magnetic field also in the direction of the first spatial co-ordinate in said periodical recurrence, and a signal-processing circuit for detecting the slopes of consecutive signal edges in the output signal and for supplying a motion direction signal in dependence upon the values and/or the sequence of values of the slopes of consecutive signal edges.

* * * * *